J. T. TENNISON.
VEHICLE AXLE.
APPLICATION FILED FEB. 18, 1911.
1,008,875.
Patented Nov. 14, 1911.
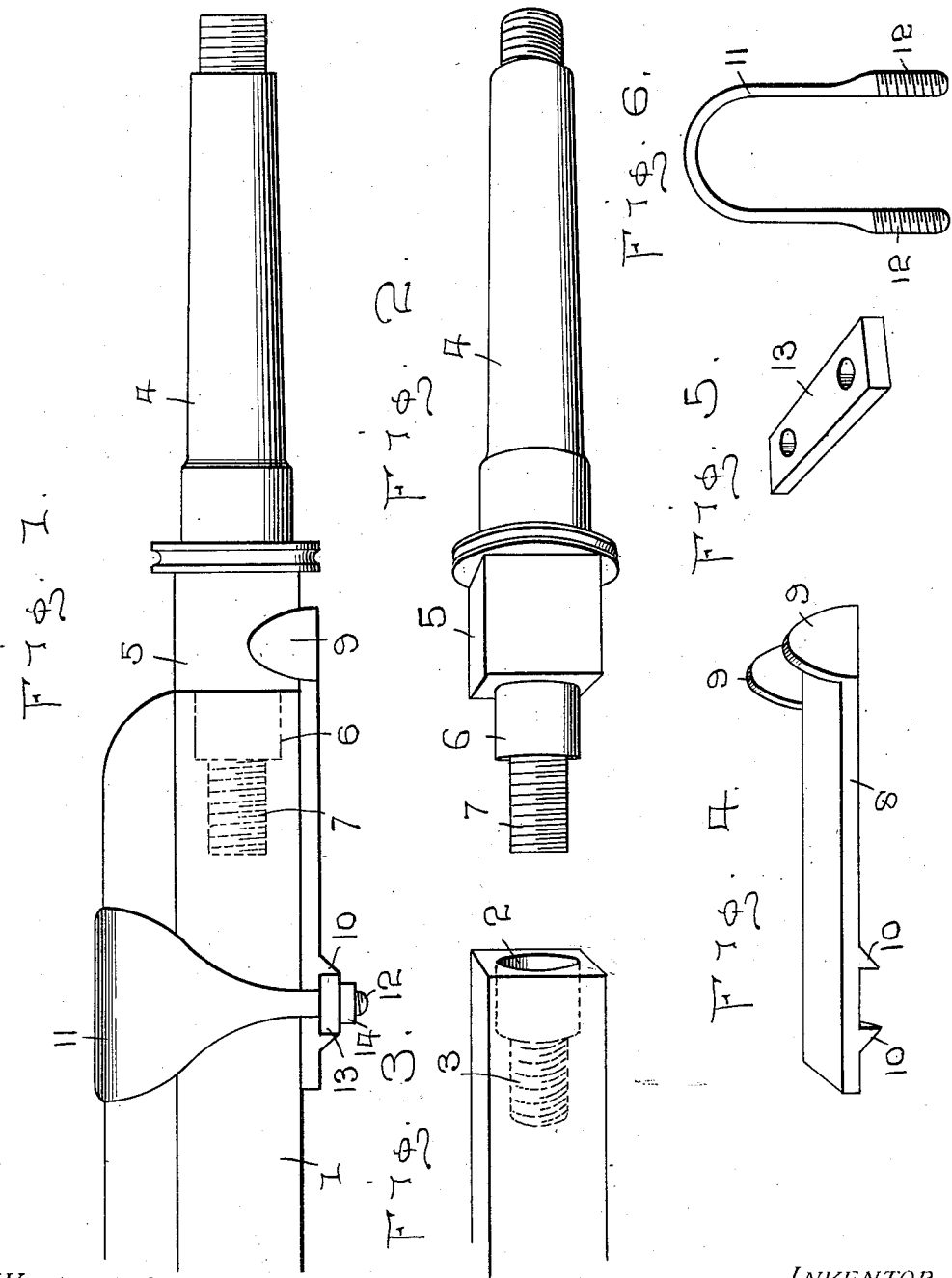
WITNESSES:
INVENTOR
J. T. Tennison
BY
Attorneys

UNITED STATES PATENT OFFICE.

JOHN T. TENNISON, OF OKEMAH, OKLAHOMA.

VEHICLE-AXLE.

1,008,875.

Specification of Letters Patent. Patented Nov. 14, 1911.

Application filed February 18, 1911. Serial No. 609,363.

*To all whom it may concern:*

Be it known that I, JOHN T. TENNISON, a citizen of the United States, residing at Okemah, in the county of Okfuskee and State of Oklahoma, have invented certain new and useful Improvements in Vehicle-Axles; and I do hereby declare the following to be a full, clear, and exact description of the invention, such as will enable others skilled in the art to which it appertains to make and use the same.

My invention relates to new and useful improvements in vehicle axles and more particularly to a vehicle axle provided with removable spindles.

The prime object of my invention is to provide a spindle which is adapted to be secured to the axle of a vehicle.

A further object of my invention is to provide means to rigidly hold said spindle in place when secured to the axle of a vehicle.

Other objects and advantages of my invention will be hereinafter more clearly set forth and pointed out in the claim.

In the accompanying drawing, I have shown the preferred form which my invention may take.

In said drawing, Figure 1 is a plan view showing a portion of an axle with my improved spindle secured thereto. Fig. 2 is a perspective view of my improved form of spindle. Fig. 3 is a perspective view of the end of an axle. Fig. 4 is a perspective view of the locking plate. Fig. 5 is a perspective view of a portion of the device, and, Fig. 6 is an end view of the securing clip.

Referring to the drawing in which similar reference numerals designate corresponding parts throughout the several views, 1 is an axle which is preferably formed from metal and is preferably square in cross section. Each end of the axle section 1 is provided with a circular seat 2 which extends a distance in the axle 1. Threaded recess 3 is formed in the axle beyond the seat 2, said recess being smaller than the seat 2 and concentric therewith. A spindle 4 adapted to coöperate with the axle section 1, is provided with a squared inner end 5 which is preferably the same size as said axle 1. The squared section 5 of the spindle is provided with a member 6 which is preferably circular in cross section and adapted to completely fill the seat 2. The member 6 is provided with a threaded extension 7 which is adapted to coöperate with the threaded recess 3.

When it is desired to secure the spindle 4 to the end of the axle 1, the extension 7 is inserted in the recess 3 and turned until the squared section 5 is brought flush with the end of said axle 1. The member 6 will then completely fill the seat 2 and the axle 1 and spindle 4 will be rigidly connected together.

In order to prevent the spindle 4 from becoming loosened from the axle, I provide a locking plate 8, the outer end of which is provided with a pair of parallel ears 9, which are adapted to engage the sides of the squared section 5. The plate 8 is preferably arranged, as shown in Fig. 1, upon the bottom of the axle section 1 and with the ears 9 engaging the sides of the squared section 5 of the spindle. The lower face of the inner end of said plate 8 is provided with a pair of extensions 10 arranged transversely thereof. A suitable form of U-shaped clip 11 provided with threaded ends 12, is adapted to be placed over the axle 1 and the portion of the vehicle body adjacent thereto, and a plate 13 is placed over the threaded ends 12 of said clip and between the extensions 10. The clip is secured in place by means of nuts 14, which are turned upon the threaded ends 12 of said clip. When the clip is thus secured in place, it will be seen that the spindle 4 will be effectually held against rotation. It will further be seen that casual removal or loosening of said spindle from said axle will be prevented. It will also be seen that should the spindle become worn or otherwise damaged, the same may be readily and easily removed and repaired or renewed.

While I have shown and described the spindle as being provided with a threaded extension, I desire it to be understood that the spindle may be provided with a threaded recess to receive a threaded extension formed upon the axle.

What I claim is:—

The combination of an axle square in cross section having a recess in its end the inner portion of which is threaded and the outer portion cylindrical, a spindle having a threaded extension engaging in said threaded portion of the recess and a cylindrical shoulder in the outer portion of the recess, and provided with a square section registering with and adjacent to the end of the axle, a flat plate engaging the under flat surfaces of the axle and spindle, ears on the sides of the flat plate embracing the sides of the square section of the spindle, parallel transverse spaced downward projections on the under side of that part of the flat plate engaging the under side of the axle, a plate transversely seated between the projections, projecting beyond the sides of the flat plate and having a vertical opening in each projecting end, an inverted U-shaped clip embracing the axle and having threaded ends projecting through the openings of the transverse plate, and nuts threaded on the projecting ends of the clip.

In testimony whereof I have signed my name to this specification in the presence of two subscribing witnesses.

JOHN T. TENNISON.

Witnesses:
A. J. MARTIN,
JAS. R. MAUCK.

Copies of this patent may be obtained for five cents each, by addressing the "Commissioner of Patents, Washington, D. C."